(No Model.)
W. W. WHITCOMB.
BICYCLE DRIVING GEAR.
No. 572,038. Patented Nov. 24, 1896.
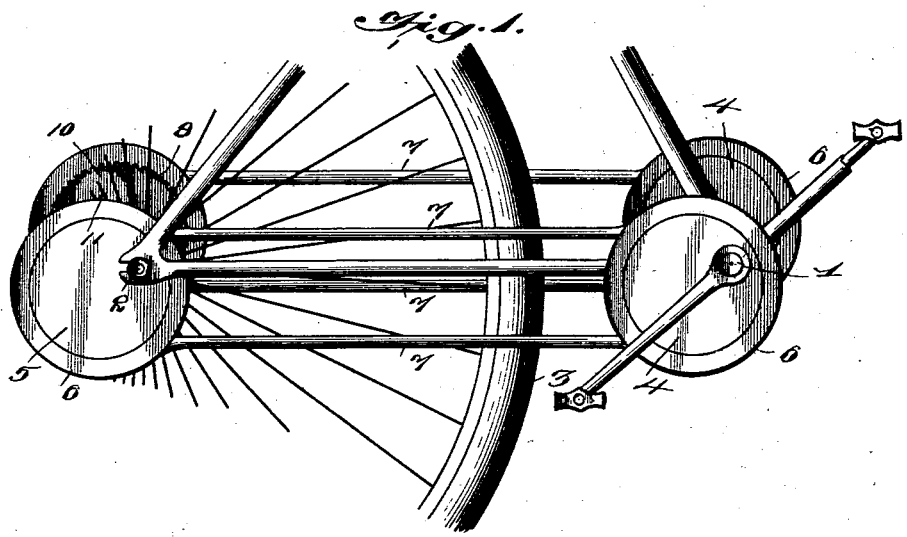
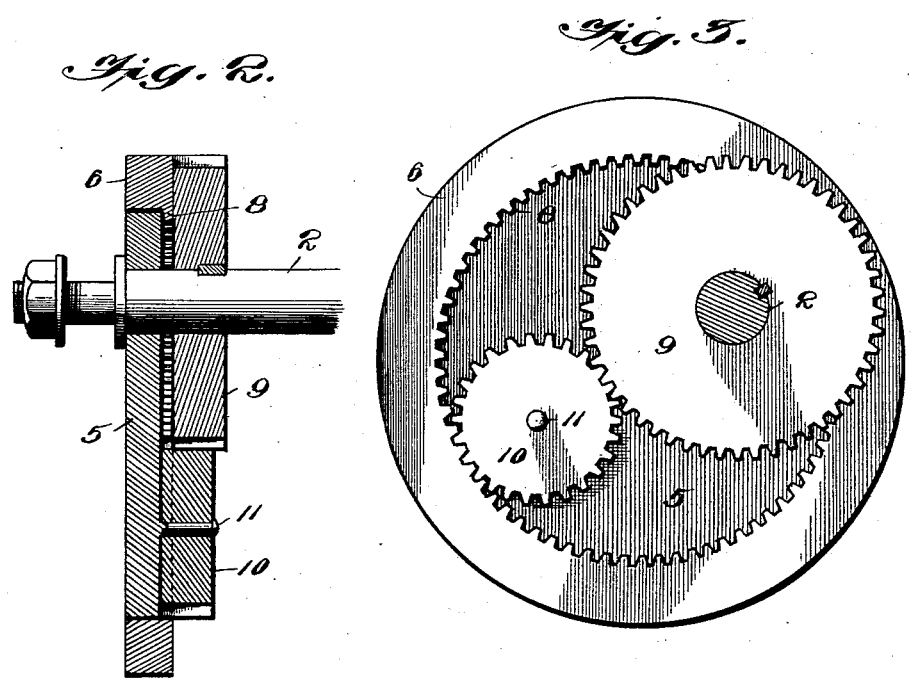
Witnesses
L. J. Koerth
R. M. Smith
Inventor
Wilson W. Whitcomb
By his Attorneys,
C. A. Snow & Co.
THE NORRIS PETERS CO., PHOTO-LITHO., WASHINGTON, D. C.

UNITED STATES PATENT OFFICE.

WILSON W. WHITCOMB, OF BATAVIA, NEW YORK.

BICYCLE DRIVING-GEAR.

SPECIFICATION forming part of Letters Patent No. 572,038, dated November 24, 1896.

Application filed June 29, 1896. Serial No. 597,389. (No model.)

*To all whom it may concern:*

Be it known that I, WILSON W. WHITCOMB, a citizen of the United States, residing at Batavia, in the county of Genesee and State of New York, have invented a new and useful Bicycle Driving-Gear, of which the following is a specification.

This invention relates to the driving-gear of bicycles; and the main object in view is to dispense with the ordinary driving-chain and sprocket-wheels and to employ in lieu thereof simple mechanism for transmitting power from the crank-axle to the hub of the driving-wheel and at the same time multiplying the speed of the driving-wheel as compared with the crank-axle.

With the above general object in view the invention consists in improved gearing of novel construction, as hereinafter particularly set forth, illustrated in the drawings, and embodied in the claims hereto appended.

In the accompanying drawings, Figure 1 is a side elevation of a sufficient portion of a bicycle to illustrate the application of the improved driving-gear thereto. Fig. 2 is a transverse section taken in line with the driving-wheel axle. Fig. 3 is a detail longitudinal section, taken at one side of the driving-wheel, looking outward and showing the speed-gearing.

Similar numerals of reference designate corresponding parts in the several figures of the drawings.

Referring to the accompanying drawings, 1 designates the crank-axle of an ordinary safety-bicycle, 2 the driving-wheel axle, and 3 the driving-wheel. Upon one end of the crank-axle is mounted fast an eccentric 4, and another eccentric of the same size (indicated at 5) is mounted loosely on the axle of the driving-wheel. Extending around each of said eccentrics is a strap 6 in the form of an annulus, and these straps are connected rigidly by means of parallel rods or bars 7, as shown. That strap which extends around the rear eccentric on the driving-wheel axle is provided with an inwardly-extending rim or annular flange 8, which is internally toothed. A central spur-pinion 9 is mounted fast upon the hub of the driving-wheel, and a planetary pinion 10 is journaled on an inwardly-projecting stud 11 on the rear eccentric, said stud meshing with the central pinion 9 and also meshing with the toothed rim or flange of the rear eccentric-strap.

From the foregoing description it will be seen that as the crank-axle is driven motion and power will be transmitted from the front eccentric to the rear eccentric by means of the straps and interposed connection. Owing to the fact that the rear eccentric revolves upon the axle of the driving-wheel and carries the planetary pinion 10 around with it while the internally-geared rim of the rear eccentric-strap does not revolve, but simply works in an orbital path, it will be seen that rotary motion will be imparted to the planetary pinion in a backward direction, as indicated by the arrow, and that the central pinion on the driving-wheel will be rotated in an opposite or forward direction, thus imparting a corresponding rotation to the driving-wheel.

It will be understood that the speed at which the machine is driven may be regulated by changing the relative sizes of the central pinion, the planetary pinion, or the internally-toothed rim of the rear eccentric-strap.

In order to avoid any possibility of the driving mechanism getting upon a dead-center, the mechanism hereinabove described is duplicated upon the other side of the machine, and the angles of the eccentrics on one side of the machine may be at a quarter or a third of a revolution from those on the other side.

The driving mechanism above described is extremely simple in construction, reliable in operation, comprises two parts, and is not liable to get out of order. If desired, the gearing may be housed in and also the front eccentric and its strap, thus leaving only the connection between the eccentric-straps exposed.

Various changes in the form, proportion, and minor details of construction may be resorted to without departing from the spirit or sacrificing any of the advantages of this invention.

Having thus described the invention, what is claimed as new is—

1. In a bicycle driving-gear, an eccentric mounted loosely on the driving-wheel axle, in combination with an internal gear surrounding said axle, a central pinion fast on the hub of the driving-wheel, a planetary pinion interposed between said central pinion and internal gear and journaled on said eccentric, and means connected with the crank-axle for driving said eccentric, substantially as described.

2. In a bicycle driving-gear, a crank-axle, an eccentric fast thereon, the driving-wheel axle, an eccentric mounted loosely thereon, straps surrounding said eccentrics and rigidly connected, an internally-toothed flange on the strap of the driving-wheel eccentric, a pinion fast on the hub of the driving-wheel, and a planetary pinion journaled on and carried by the driving-wheel eccentric and meshing with the central pinion and the internally-toothed flange, substantially as described.

In testimony that I claim the foregoing as my own I have hereto affixed my signature in the presence of two witnesses.

WILSON W. WHITCOMB.

Witnesses:
 H. W. TALLMAN,
 WM. M. SHIRLEY.